March 19, 1946.  S. E. HEYMANN  2,396,655
HEATER CONTROL APPARATUS
Filed Oct. 13, 1943
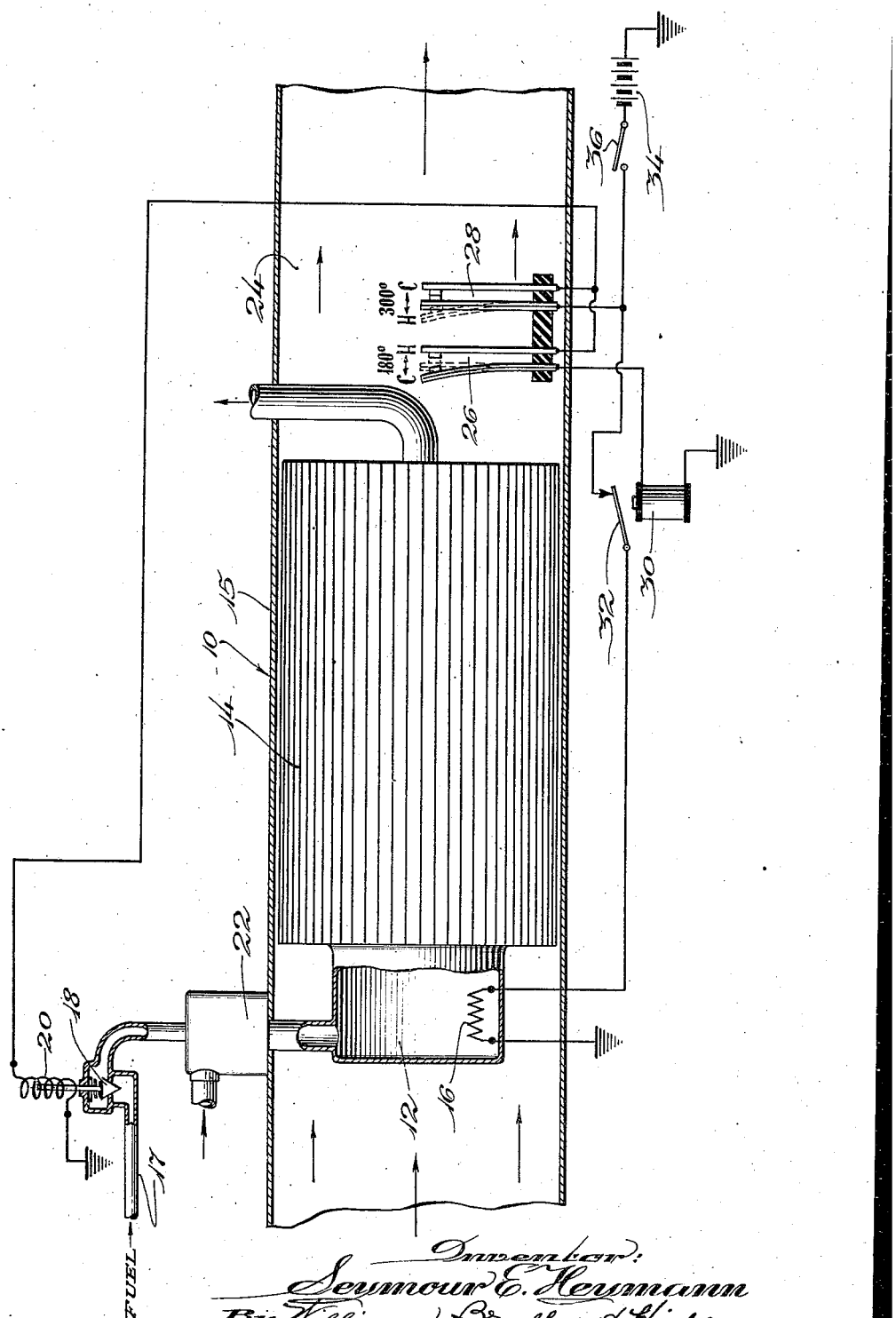

Patented Mar. 19, 1946

2,396,655

UNITED STATES PATENT OFFICE 2,396,655

HEATER CONTROL APPARATUS

Seymour E. Heymann, Evanston, Ill., assignor to Stewart-Warner Corporation, Chicago, Ill., a corporation of Virginia Application October 13, 1943, Serial No. 506,082

3 Claims. (Cl. 126—116)

My invention relates generally to heat control apparatus and more particularly to improved thermostatic control circuits and apparatus for aircraft heaters.

In aircraft heaters of the hermetically sealed or internal combustion type it has become common practice to utilize an electrically energized igniter controlled by a thermostatic igniter switch which operates to de-energize the igniter as soon as the heater attains a substantially normal operating temperature, and to provide a thermostatic overheat switch which operates to effect the closure of a solenoid valve in the fuel supply line for the heater whenever the heater temperature rises to a dangerous or abnormal value. In such systems, after an overheat condition has prevailed to cause operation of the overheat thermostat, the temperature of the heater must drop to the lower value at which the thermostatic igniter switch operates before the igniter is re-energized. Because of the time required for the heater to drop in temperature, and, further, because of the time required to reheat the igniter to its effective ignition temperature, the ventilating air discharged from the heater will become quite cool before re-ignition of the heater takes place. This delay in recycling of the heater is disadvantageous since such delay may result not only in discomfort to the crew but also in an undesirable cooling of equipment and accessories of the aircraft which must be maintained at a reasonably high temperature for proper operation.

It is thus an object of my invention to provide an improved thermostatic control system for aircraft heaters in which adequate protection against overheat conditions is maintained, but in which reignition of the heater follows rapidly after extinction of the heater due to such overheat condition.

A further object is to provide an improved thermostatic control system and apparatus for aircraft heaters of the hermetically sealed type, which is simple in construction, quickly responsive to changing conditions in the operation of the heater, and which will improve the overall heat output of the heating system.

Other objects will appear from the following description, reference being had to the accompanying drawing, which constitutes a schematic diagram of the heater and the electrical control system associated therewith.

In the drawing a heater 10 is conventionally illustrated as including a combustion chamber 12, and a heat exchanger 14 surrounded by a casing 15. Within the combustion chamber 12 is an electrical igniter 16, illustrated as of the hot wire type. Liquid fuel from a suitable source is supplied through a conduit 17 under the control of a valve 18 which is resiliently held in closed position and adapted to be opened on energization of a solenoid 20.

Fuel from the supply 17 is mixed with air in a carburetor 22, and is supplied to the combustion chamber 12. Ventilating air is forced past the heater in the direction indicated by the arrows and is conveyed from the heater through a ventilating air duct 24.

Suitably positioned adjacent the ventilating air outlet of the heater within the duct 24, are a pair of thermostatic switches 26, 28, which are diagrammatically illustrated in the drawing. The thermostatic switch 26 is open when cold and is adapted to close at a relatively low temperature, such, for example, as 180° F., while the switch 28 is normally closed and is adapted to open at a relatively higher temperature such, for example, as 300° F.

A relay 30 has a switch 32 which is closed when the relay 30 is de-energized, the switch 32 being connected in series with a source of current 34, a manually operable control switch 36 and igniter 16.

The normally closed thermostatic switch 28 is connected in series with the battery 34, switch 36, and solenoid winding 20. When both switches 26 and 28 are closed there is completed a circuit which may be traced as follows: from the battery 34, switches 36, 28, and 26, and relay winding 30 to the grounded terminal of the battery 34.

In using the heater the pilot will first close the switch 36 to energize the control circuits. Closure of this switch will result in energization of the igniter 16, since the switch 32 will be closed, and will also result in energization of the solenoid 20, since the switch 28 will be closed. Assuming normal conditions, the supply of fuel flowing through the carburetor 22 and into the combustion chamber 12 will be ignited by the igniter 16, and combustion of the fuel will, after a short time, result in heating the ventilating air to a temperature sufficient to cause the thermostatic switch 26 to close. Closure of this switch 26 will energize relay 30 to open switch 32 thereby de-energizing the igniter 16.

Operation of the heater will continue in this manner, unless due to some abnormal condition the heater becomes overheated. When this occurs, at a temperature of approximately 300° F., the thermostatic switch 28 will open, thus breaking the circuit to the solenoid 20 and permitting the fuel valve to close under the influence of its spring, thereby shutting off the supply of fuel to the heater. Opening the switch 28 will also result in opening the circuit previously completed by the thermostatic switch 26, so that the relay 30 will be de-energized, permitting its switch 32 to close, and thereby re-energizing the igniter 16.

When the fuel supply is cut off by the closure of the solenoid operated valve 18, the heater temperature will be lowered by the ventilating air and after a short time the temperature of the ventilating air at the outlet of the heater will drop sufficiently to permit re-closing of the thermostatic switch 28. When the switch 28 is closed the solenoid 20 will be re-energized, thereby again permitting flow of the fuel to the carburetor 22, and hence to the combustion chamber 12. Ignition will take place substantially immediately because, it will be noted, the igniter 16 will have become re-heated to ignition temperature during the interval that the heater was being cooled as a result of its lack of fuel supply. Even though the condition which caused the heater to overheat remains, the heater will continue to deliver ventilating air at a reasonably high temperature substantially continuously.

The system is relatively simple since it requires but two thermostatic switches and other elements which are substantially conventional in aircraft heater control systems.

While I have shown and described but a single embodiment of my invention, it will be evident to those skilled in the art that the invention may be embodied in various other forms utilizing equivalent electric circuits to obtain substantially the same results. I therefore desire by the following claims to include within the scope of my invention all modifications and variations by which substantially the results of the invention may be attained by the use of substantially the same or equivalent means.

I claim:

1. In an aircraft heater having a combustion chamber, an electro-magnetically operated valve for controlling the supply of fuel to the combustion chamber, a hot wire electric igniter for igniting the fuel supplied to the combustion chamber, and means for circulating ventilating air past the heater; the combination of two thermostatic switches positioned to be responsive to the temperature of air heated by the heater, the first of said switches being open when cold and closing upon being heated to the temperature attained during normal operation of the heater, and the second of said switches being closed when cold and opening when heated to a temperature substantially above that attained by the heater during normal operation, a source of electric energy, a relay having normally closed switch contacts, a first circuit including said relay switch contacts, said igniter, and said source of energy in series, a second circuit including said second switch and said electro-magnetically operated valve in series with said source of energy, and a third circuit including said relay, said first and second thermostatic switches and said source of energy in series.

2. In an aircraft heater having a combustion chamber, a heat exchanger receiving the products of combustion and transmitting heat to ventilating air, a hot wire electric igniter, a source of fuel, and electromagnetic means for controlling the supply of fuel from said source to said combustion chamber; the combination of an igniter circuit for energizing said igniter including switch means to open and close said igniter circuit, a first thermostatic switch operable when the heater attains its normal operating temperature to actuate said switch means to open said igniter circuit, and a control circuit including a second thermostatic switch responsive to the temperature of the ventilating air from said heater, and operable at a temperature substantially exceeding the normal operating temperature to de-energize said electro-magnetically operated valve means and to actuate said switch means to close said igniter circuit, and operable upon lowering of the temperature of the ventilating air from a value substantially above its normal operating temperature to the value approaching its normal operating temperature to cause energization of said electromagnetic valve means and to actuate said switch means to open said igniter circuit.

3. In a heating apparatus having a combustion chamber, a heat exchanger connected to the combustion chamber, means for supplying fuel and air to the combustion chamber, an electro-magnetically operated valve controlling the fuel supply, and an electrical igniter of the hot wire type for the ignition of fuel in the combustion chamber; means for controlling the operation of the heating apparatus comprising a source of electrical energy, a manually controlled switch, a first and second thermostatic switch responsive to the temperature of the heat exchanger, said first switch operating at a temperature corresponding to that attained by said heat exchanger as a result of normal combustion for a short period of time and said second switch operating at a higher temperature corresponding to that attained by said heat exchanger under abnormal conditions, a first circuit including said source and said igniter completed upon closure of said manual switch whenever said first thermostatic switch is below its operating temperature and opened by the latter when it attains its operating temperature, a second circuit including said electromagnetically operated valve and said source completed upon closure of said manual switch and opened upon operation of said second thermostatic switch, due to attainment of a temperature at or above its operating temperature, and means for causing completion of said first circuit whenever both of said thermostatic switches are above their respective operating temperatures.

SEYMOUR E. HEYMANN.